July 22, 1969   J. R. ARTHUR ET AL   3,457,504
MAGNITUDE INDICATING MEANS FOR ACCUMULATED METALLIC PARTICLES
Filed Aug. 22, 1966
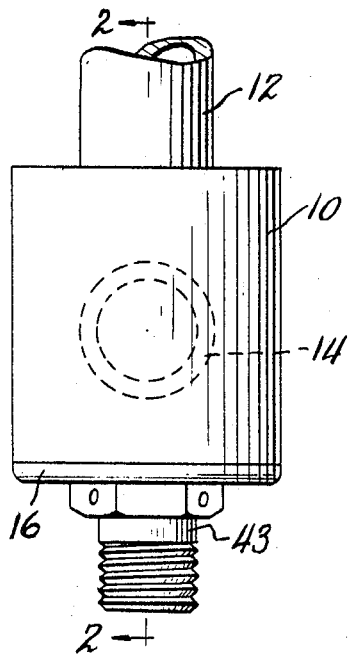
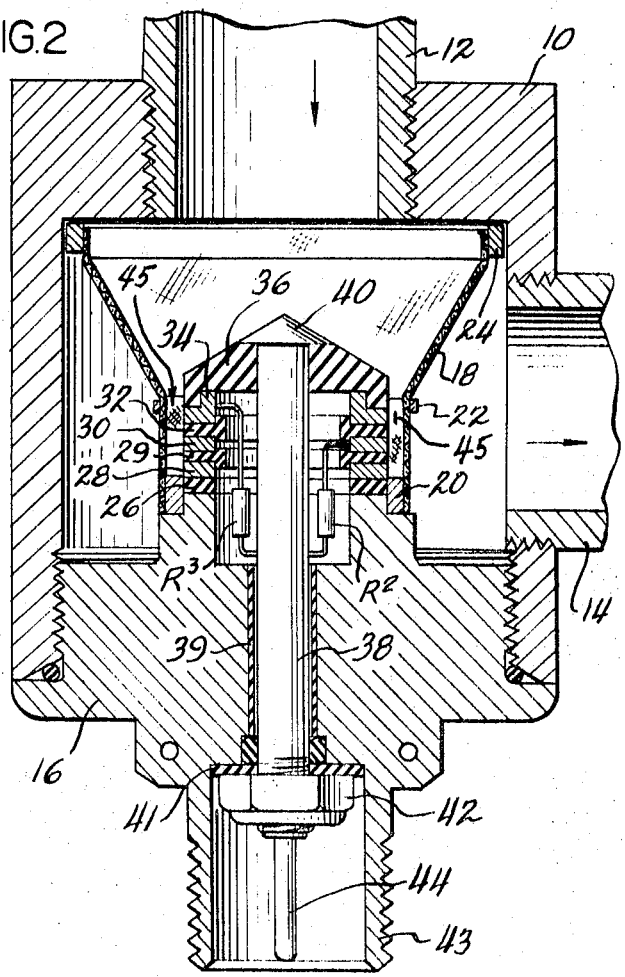
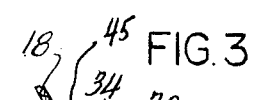
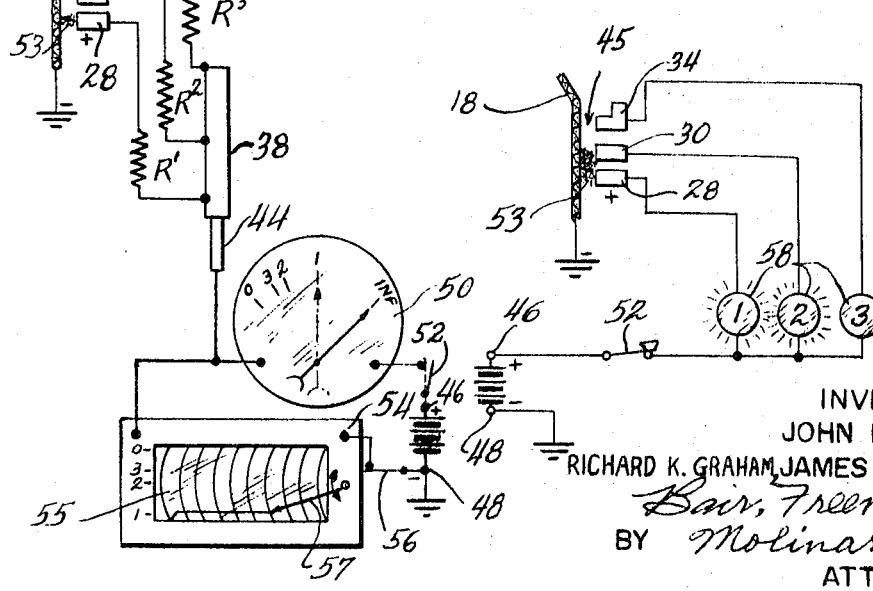
INVENTORS.
JOHN R. ARTHUR,
RICHARD K. GRAHAM, JAMES L. POOL
BY Bair, Freeman & Molinare
ATTORNEYS.

United States Patent Office 3,457,504
Patented July 22, 1969

3,457,504
MAGNITUDE INDICATING MEANS FOR
ACCUMULATED METALLIC PARTICLES
John R. Arthur, James L. Pool, and Richard K. Graham, Clarinda, Iowa, assignors to Lisle Corporation, a corporation of Iowa
Filed Aug. 22, 1966, Ser. No. 573,974
Int. Cl. G01r 27/22; G01n 15/06
U.S. Cl. 324—65                                        5 Claims

ABSTRACT OF THE DISCLOSURE

A magnitude indicating means for accumulated metallic particles is provided in the form of a first electrode on one side of an electric circuit and a plurality of electrodes on the other side of the circuit, the circuit being for the purpose of actuating an indicating means of current magnitude type. In order to get a magnitude reading on the indicating means of the circuit, the plurality of electrodes are provided with high resistance elements, one for each electrode, and these are in series with the respective plurality of electrodes and progressively in parallel when bridged by metallic particles. The indicating means may be mere magnitude indicating means or a magnitude indicating means of continuously recording type.

---

This invention relates to a chip gauge wherein filter or strainer means is interposed in the line of flow of a liquid for filtering out metal particles, the gauge being operable to indicate the presence of such particles as well as the quantity thereof.

One object of the invention is to provide an electrically operable chip gauge wherein electrodes and a filter element are spaced from each other but when metal particles accumulate between them they establish a circuit so that current flow indicating means is energized thereby in order to indicate the presence of such particles.

Another object is to provide a circuit arrangement including a plurality of electrodes in opposition to a metal screen which are progressively contacted by an increasing accumulation of particles, current flow indicating means being so associated therewith as to give a quantitative indication of such accumulation. Still another object is to provide the plurality of electrodes, each connected in series circuit with a resistance element whereby upon the progressive bridging of particles across the screen to the electrodes the resistance through the circuit will be reduced from substantially infinity to substantially that of the resistance element or elements, thereby indicating the collection of metal particles as distinguished from the absence of metal particles bridging the screen and one electrode, and individually indicating the bridging of two or more electrodes.

A further object is to provide an arrangement for gauging the amount of accumulated particles by the provision of a plurality of electrodes instead of a single one and a high resistance element in series with each of the electrodes whereby the current flow indicating means will indicate the progressive bridging of the electrodes with accumulated particles.

Still a further object is to provide a gauge of the character disclosed in the form of a plug which is removable with respect to a housing-like fitting through which liquid flows whereupon the accumulated particles within the filter element may be removed therefrom.

An additional object is to provide means to measure the amount of particles accumulated by providing a plurality of electrodes in a series-parallel circuit arrangement so that as successive electrodes are bridged by accumulated particles, the electric current flowing through the indicating circuit will increase by definite steps which, on an indicator for current flow, will show how many of the electrodes are bridged with particles.

Another additional object is to provide means for continuously recording the flow of electricity through the electric indicating circuit to provide a running record of collected particles.

A further additional object is to provide a modified form of indicating means comprising a separate indicator (such as electric bulbs) for each electrode so that one or more of the indicators is energized to show the progressive accumulation of particles.

With these and other objects in view, our invention consists in the construction, arrangement and combination of the various parts of our chip gauge, whereby the objects above contemplated are attained, as hereinafter more fully set forth, pointed out in our claims, and illustrated in detail on the accompanying drawing, wherein:

FIG. 1 is a side elevation of a chip gauge embodying our invention;

FIG. 2 is an enlarged vertical sectional view therethrough on the line 2—2 of FIG. 1;

FIG. 3 is an electrodiagrammatic view showing a current flow indicator and a recorder energized by the chip gauge; and FIG. 4 is an electrodiagrammatic view of a modification in which indicator lights are utilized instead of the indicator and recorder of FIG. 3.

On the accompanying drawing we have used the reference numeral 10 to indicate a housing, 12 an inlet pipe thereto and 14 an outlet pipe therefrom. As shown in FIG. 2, the lower end of the housing 10 is closed by means of a removable plug 16. The plug supports a filter element 18 such as a metal screen. Metal support rings 20, 22 and 24 are provided for proper support of the filter element on the plug.

Stacked on top of the plug 16 and located inside the filter element 18 is a plurality of elements as follows:

a first insulating ring 26
a first electrode 28
a second insulating ring 29
a second electrode 30
a third insulating ring 32
a third electrode 34
an insulating cap 36.

A clamp bolt 38 is provided to clamp the stack of elements just enumerated in position, and has a head 40 to engage the insulating cap 36, the lower end of the clamp bolt being provided with a clamp nut 42. The clamp nut 42 is located within a nipple 43 adapted to be connected with an electric wire conduit or the like and within this nipple an electric terminal 44 forms an extension of the clamp bolt 38.

The electrodes 28, 30 and 34 have external diameters substantially coincident with external diameters of the insulating rings 26, 29 and 32 and the insulation cap 36 as shown in FIG. 2, and this external diameter is somewhat less than a tubular lower portion of the filter element 18. This provides an annular space 45 in which metal particles may accumulate as they are filtered out of fluid flowing from the inlet pipe 12 through the housing 10 and out of the outlet pipe 14. By way of example, lubricating oil for machinery may be circulated through the housing 10 and any particles of iron, steel, brass, aluminum or the like worn from gears or other operating elements may be filtered out of the circulating oil and will gravitate downwardly inside the filter element 18 and collect in the annular space 45. An insulating sleeve 39 and an insulating washer 41 are provided for the terminal screw 38. By providing an electric circuit wherein one wire is grounded thereby electrifying the filter element and the other wire is connected to the terminal 44, an indication of accumulated particles may be determined as will now be described.

Referring to FIG. 3, current supply terminals 46 and 48 are provided which may be suitably energized from any source of current, such as an automobile battery 47. The terminal 46 is connected to a current flow indicator 50 through a push-button or other suitable switch 52. The wire 48 is grounded and thereby electrically connected to the metal screen 18. The circuit includes resistors $R^1$, $R^2$, and $R^3$. An inspection of the electric circuit shows that the resistors $R^1$, $R^2$, $R^3$ are connected in series in a circuit involving terminals 44 and 38, electrodes 28, 30, and 34, screen 18, ground, flow indicator 50, and switch 52 back to 48. The three resistors are connected in parallel or shunt with each other thus providing a series-parallel circuit. When current is supplied to the terminals 46 and 48, an electrical indicating circuit is provided in conjunction with the flow indicator 50 which may be a miliameter, a volt meter having a parallel shunt, or an ohmmeter in which case the external source of current would be eliminated and terminals 46 and 48 would be connected since an ohmmeter has its own current source. Alternatively or in addition to the flow indicator 50, a recorder 54 may be provided having a time driven tape 55 and a recording arm 57 adapted to trace a line on the tape, the arm being responsive to the amount of current flowing through the recorder, and a switch 56 being provided for connecting the recorder in the circuit. Thus, either the indicator 50 of the recorder 54 may be used, or both may be used as desired.

FIG. 3 indicates three resistor circuits and it will be noted that one of the circuits is established by bridging across with metallic particles 53 from the filter element 18 to the electrode 28. The current flow indicator 50 is arbitrarily marked to indicate the shorting out of one, two, or three of the resistors and its action may be illustrated by the following formulas:

| No. of short circuits | Calculations (R=10,000Ω) | Total resistance | Ohms |
|---|---|---|---|
| 0 | | $R^T=$ | Very high |
| 1 | $\frac{1}{R^T}=\frac{1}{R^1}=\frac{1}{10,000}$ | $\therefore R^T=$ | 10,000 |
| 2 | $\frac{1}{R^T}=\frac{1}{R^1}+\frac{1}{R^2}=\frac{2}{10,000}$ | $\therefore R^T=$ | 5,000 |
| 3 | $\frac{1}{R^T}=\frac{1}{R^1}+\frac{1}{R^2}+\frac{1}{R^3}=\frac{3}{10,000}$ | $\therefore R^T=$ | 3,333 |

The above formulas are standard for resistors in parallel. When there are not short circuits caused by the accumulation of particles 53, the resistance in the circuit would be very high. This is because the only flow across from the electrodes to the screen 18 would be through the liquid which would vary depending upon its character, but in the case of lubricating oil would be quite high (resistance close to infinity which is the same as current flow close to zero). Then by using resistors R, each of a value such as 10,000 ohms, when there is one short circuit the 10,000 ohm value would show up on the indicator 50. This, for instance, might be the mid-point between zero and infinity (0 and INF) in which case if the number of short circuits were two, the resistance would be cut in half and the indicator needle would stand at half way between 0 and INF (the 5,000 ohm mark) shown by dot-and-dash lines on the indicator 50 in FIG. 3. Similarly, the shorting of three resistors would give a reading at 3,333 ohms as shown on the calculation chart.

In FIG. 4, a modification is shown wherein indicator lights 58 are substituted for the current flow indicator 50. Accordingly, when particles 53 bridge across the gap between the screen 18 and electrodes 28 and 30, the indicator lights numbered 1 and 2 will be energized to indicate the quantity of particles present. When they bridge across to the electrode 34, the light numbered 3 will be energized to indicate such quantity as to require cleaning (including insulating sleeve 39 and insulating washer 41).

From the foregoing specification it will be obvious that we have provided a chip gauge suitable for indicating and/or recording the flow of electricity through a system of electrodes and filter screen which system may include resistors, the system being variably affected by the quantity of particles collected or accumulated. A gauge of this character is particularly valuable in the operation of airplane engines and the like where malfunctions caused by an accumulation of metal particles should be promptly called to the attention of the pilot.

The number of resistors brought into the circuit by the shorting across of the electrodes and filter screen combination effects a variation in the flow of electricity through the indicator circuit upon the accumulation of electrically conducting particles so that a feasible indication of such accumulation is had. We disclose a chip gauge in which (when there is only one resistor R) the indicator 50 will indicate whether or not there is an accumulation of particles. When a plurality of the resistors are arranged in a series-parallel circuit such as shown in FIG. 3, a quantitative indication is had by readings on the indicator to show the number of individual electrodes short circuited by the collected metal particles. The particles offer some resistance to current flow but the ohmage value is extremely low compared to resistors of 1000 or higher ohmage so that they produce the effect of substantial short circuits thereby having the effect of cutting in the resistors successively as the additional electrodes are bridged by particles 53 in relation to the screen 18. Accordingly, an effective gauge of the quantity of collected particles is provided to indicate to the operator of an engine or the like the degree of particles collected so that he can remove the plug 16 and clean the particles from the filter element 18 at predetermined times commensurate with the amount of collected particles instead of haphazardly or at specified time intervals which might be inadequate because of an excessive rate of particle collection. The indicator 50 can be operated at any time to show how many of the electrodes are bridged by the particles and the recorder 54 will provide a running record so that when two or three of the electrodes are bridged, the plug can be removed and the particles cleaned therefrom.

We claim as our invention:

1. In a magnitude indicating means for accumulated metallic particles, a filter element, single electrode means, plural electrode means oposed to said single electrode means, means for suporting said single and plural electrode means in a housing through which fluid flows, and in which fluid metallic particles may be present, said single and plural electrode means being positioned with respect to said filter means in such manner that metallic particles filtered from such fluid will upon accumulation bridge across between one or more of said plural electrode means and said single electrode means, and means to measure the amount of metallic particles so accumulated comprising an electric circuit, means for supplying current thereto, said circuit including a high resistance element in circuit with each of said plural electrode means and a single current magnitude indicating means in series with all of said high resistance elements and said single and plural electrode means, said high resistance elements being in a parallel circuit whereby metallic material bridging successive plural electrode means will progressively reduce the resistance in said current magnitude indicating means and thereby increase the current flow therethrough to operate the same for quantitative indicating purposes.

2. A magnitude indicating means for accumulated metallic particles according to claim 1 wherein said single and plural electrode means is supported by a plug which is removable with respect to the housing whereupon the metallic particles bridging said electrode means may be removed from said filter element.

3. A magnitude indicating means for accumulated metallic particles according to claim 1 wherein said current magnitude indicating means continuously records the current flowing in said circuit.

4. A magnitude indicating means for accumulated metallic particles according to claim 1 wherein said means for measuring current flowing through said magnitude indicating means is responsive to the change in resistance in said circuit resulting from deposit of such metallic particles in bridging relation to the successive electrode means.

5. In a magnitude indicating means for accumulated metallic particles of the character described utilizing an electric circuit, filter means positioned in a container for filtering metallic particles from liquid passing through the container, a first electrode for one side of said electric circuit, a plurality of electrodes for the other side of said electric circuit, each of which is electrically spaced from said first electrode, said plurality of electrodes being electrically spaced from each other and positioned to result in the space between them and said first electrode being bridged by filtered metallic particles, and means for determining that such quantity of particles has been accumulated and indicating the magnitude of such accumulation comprising means for supplying current to said electric circuit, said circuit including a single current magnitude indicating means and a plurality of high resistance elements, one in series with each of said plurality of electrodes, said high resistance elements being progressively included in parallel in said electric circuit by particle accumulation.

References Cited

UNITED STATES PATENTS

| | | | |
|---|---|---|---|
| 2,047,638 | 7/1936 | Kott | 324—65 XR |
| 2,252,222 | 8/1941 | Van Os | 324—65 |
| 2,412,363 | 12/1945 | Silverman | 73—304 XR |
| 2,706,905 | 4/1955 | Wilson | 73—61 |
| 3,238,452 | 3/1966 | Schmitt et al. | 324—61 |
| 3,264,557 | 8/1966 | Heeps | 324—65 |

EDWARD E. KUBASIEWICZ, Primary Examiner

U.S. Cl. X.R.

73—61; 304—235